(12) United States Patent
Marvin

(10) Patent No.: US 7,444,620 B2
(45) Date of Patent: Oct. 28, 2008

(54) SYSTEMS AND METHODS FOR A COMMON RUNTIME CONTAINER FRAMEWORK

(75) Inventor: Kyle Marvin, Kingwood, TX (US)

(73) Assignee: BEA Systems, Inc., San Jose, CA (US)

( * ) Notice: Subject to any disclaimer, the term of this patent is extended or adjusted under 35 U.S.C. 154(b) by 938 days.

(21) Appl. No.: 10/776,435

(22) Filed: Feb. 11, 2004

(65) Prior Publication Data

US 2004/0172618 A1    Sep. 2, 2004

Related U.S. Application Data

(60) Provisional application No. 60/451,012, filed on Feb. 28, 2003.

(51) Int. Cl.
G06F 9/44 (2006.01)

(52) U.S. Cl. ...................................................... 717/116

(58) Field of Classification Search ................. 717/136, 717/177, 116; 709/201–206, 227; 719/328–330; 707/100
See application file for complete search history.

(56) References Cited

U.S. PATENT DOCUMENTS

| | | | |
|---|---|---|---|
| 5,321,841 A | 6/1994 | East et al. | |
| 5,469,562 A | 11/1995 | Saether | 714/20 |
| 5,604,860 A | 2/1997 | McLaughlin et al. | 715/866 |
| 5,630,131 A | 5/1997 | Palevich et al. | 717/108 |
| 5,748,975 A | 5/1998 | Van De Vanter | 715/531 |
| 5,801,958 A | 9/1998 | Dangelo et al. | |
| 5,835,769 A | 11/1998 | Jervis et al. | 717/113 |
| 5,836,014 A | 11/1998 | Faiman, Jr. | 717/156 |
| 5,862,327 A | 1/1999 | Kwang | |
| 5,867,822 A | 2/1999 | Sankar | |
| 5,944,794 A | 8/1999 | Okamoto et al. | 709/225 |
| 5,950,010 A | 9/1999 | Hesse | |
| 5,961,593 A | 10/1999 | Gabber et al. | |
| 5,966,535 A | 10/1999 | Benedikt et al. | |
| 6,012,083 A | 1/2000 | Savitzky et al. | 709/202 |

(Continued)

FOREIGN PATENT DOCUMENTS

CA    2 248 634    3/2000

(Continued)

OTHER PUBLICATIONS

Int'l Search Report for PCT/US04/05427, Feb. 10, 2004.

(Continued)

Primary Examiner—Tuan Anh Vu
(74) Attorney, Agent, or Firm—Womble Carlyle Sandridge & Rice, PLLC

(57) ABSTRACT

An extensible container framework can be used to create and deploy software runtime containers. Such a framework can allow containers to inherit functionality and runtime environment attributes of other such containers. An extensible container framework can support multiple component types, and can provide the ability to add incremental features through a common component architecture. A framework can provide a common set of container infrastructure and services, and can expand the leverage of capabilities built around each container. This description is not intended to be a complete description of, or limit the scope of, the invention. Other features, aspects, and objects of the invention can be obtained from a review of the specification, the figures, and the claims.

21 Claims, 4 Drawing Sheets

U.S. PATENT DOCUMENTS

| | | | |
|---|---|---|---|
| 6,016,495 A | 1/2000 | McKeehan et al. | 707/103 R |
| 6,018,730 A | 1/2000 | Nichols et al. | 706/45 |
| 6,023,578 A | 2/2000 | Birsan et al. | 717/105 |
| 6,023,722 A | 2/2000 | Colyer | |
| 6,028,997 A | 2/2000 | Leymann et al. | |
| 6,029,000 A | 2/2000 | Woolsey et al. | |
| 6,044,217 A | 3/2000 | Brealey et al. | 717/107 |
| 6,067,548 A | 5/2000 | Cheng | |
| 6,067,623 A | 5/2000 | Blakley et al. | |
| 6,070,184 A | 5/2000 | Blount et al. | 709/200 |
| 6,092,102 A | 7/2000 | Wagner | |
| 6,119,149 A | 9/2000 | Notani | |
| 6,141,686 A | 10/2000 | Jackowski | |
| 6,141,701 A | 10/2000 | Whitney | 710/5 |
| 6,148,336 A | 11/2000 | Thomas et al. | |
| 6,185,734 B1 | 2/2001 | Saboff | |
| 6,212,546 B1 | 4/2001 | Starkovich et al. | 709/203 |
| 6,222,533 B1 | 4/2001 | Notani | |
| 6,226,675 B1 | 5/2001 | Meltzer et al. | |
| 6,230,287 B1 | 5/2001 | Pinard et al. | |
| 6,230,309 B1 | 5/2001 | Turner | |
| 6,237,135 B1 | 5/2001 | Timbol | |
| 6,243,737 B1 | 6/2001 | Flanagan et al. | 709/202 |
| 6,282,711 B1 | 8/2001 | Halpern | |
| 6,292,932 B1 | 9/2001 | Baisley et al. | 717/114 |
| 6,311,327 B1 | 10/2001 | O'Brien et al. | 717/114 |
| 6,324,681 B1 | 11/2001 | Sebesta | |
| 6,330,569 B1 | 12/2001 | Baisley et al. | 707/203 |
| 6,334,114 B1 | 12/2001 | Jacobs et al. | 705/26 |
| 6,338,064 B1 | 1/2002 | Ault et al. | |
| 6,343,265 B1 | 1/2002 | Glebov et al. | 703/25 |
| 6,349,408 B1 | 2/2002 | Smith | |
| 6,353,923 B1 | 3/2002 | Bogle et al. | 717/128 |
| 6,360,358 B1 | 3/2002 | Elsbree et al. | 717/120 |
| 6,367,068 B1 | 4/2002 | Vaidyanathan et al. | |
| 6,377,939 B1 | 4/2002 | Young | 705/34 |
| 6,393,605 B1 | 5/2002 | Loomans | |
| 6,408,311 B1 | 6/2002 | Baisley et al. | 707/203 |
| 6,411,698 B1 | 6/2002 | Bauer et al. | 379/207.01 |
| 6,445,711 B1 | 9/2002 | Scheel et al. | 370/402 |
| 6,470,364 B1 | 10/2002 | Prinzing | 715/530 |
| 6,516,322 B1 | 2/2003 | Meredith | 707/102 |
| 6,549,949 B1 | 4/2003 | Bowman-Amuah | |
| 6,560,769 B1 | 5/2003 | Moore et al. | 717/100 |
| 6,567,738 B2 | 5/2003 | Gopp et al. | |
| 6,584,454 B1 | 6/2003 | Hummel et al. | 705/59 |
| 6,594,693 B1 | 7/2003 | Borwankar | |
| 6,594,700 B1 | 7/2003 | Graham et al. | 709/230 |
| 6,601,113 B1 | 7/2003 | Koistinen et al. | 719/316 |
| 6,604,198 B1 | 8/2003 | Beckman et al. | |
| 6,609,115 B1 | 8/2003 | Mehring et al. | 705/51 |
| 6,615,258 B1 | 9/2003 | Barry et al. | 709/223 |
| 6,636,491 B1 | 10/2003 | Kari et al. | 370/328 |
| 6,637,020 B1 | 10/2003 | Hammond | 717/107 |
| 6,643,652 B2 | 11/2003 | Helgeson et al. | 707/10 |
| 6,654,932 B1 | 11/2003 | Bahrs et al. | 715/507 |
| 6,662,357 B1 | 12/2003 | Bowman-Amuah | |
| 6,678,518 B2 | 1/2004 | Eerola | 455/422.1 |
| 6,684,388 B1 | 1/2004 | Gupta et al. | 717/136 |
| 6,687,702 B2 | 2/2004 | Vaitheeswaran et al. | |
| 6,687,848 B1 | 2/2004 | Najmi | 714/4 |
| 6,721,740 B1 | 4/2004 | Skinner et al. | |
| 6,721,747 B2 | 4/2004 | Lipkin | |
| 6,721,779 B1 | 4/2004 | Maffeis | 709/202 |
| 6,732,237 B1 | 5/2004 | Jacobs et al. | 711/119 |
| 6,748,420 B1 | 6/2004 | Quatrano et al. | 709/205 |
| 6,754,884 B1 | 6/2004 | Lucas et al. | 717/108 |
| 6,757,689 B2 | 6/2004 | Battas et al. | |
| 6,789,054 B1 | 9/2004 | Makhlouf | 703/6 |
| 6,795,967 B1 | 9/2004 | Evans et al. | |
| 6,799,718 B2 | 10/2004 | Chan et al. | 235/375 |
| 6,802,000 B1 | 10/2004 | Greene et al. | |
| 6,804,686 B1 | 10/2004 | Stone et al. | 707/104.1 |
| 6,823,495 B1 | 11/2004 | Vedula et al. | 715/805 |
| 6,832,238 B1 | 12/2004 | Sharma et al. | 709/201 |
| 6,836,883 B1 | 12/2004 | Abrams et al. | 717/140 |
| 6,847,981 B2 | 1/2005 | Song et al. | 707/104.1 |
| 6,850,979 B1 | 2/2005 | Saulpaugh et al. | 709/225 |
| 6,859,180 B1 | 2/2005 | Rivera | |
| 6,874,143 B1 | 3/2005 | Murray et al. | 717/173 |
| 6,889,244 B1 | 5/2005 | Gaither et al. | 709/202 |
| 6,915,519 B2 | 7/2005 | Williamson et al. | 719/313 |
| 6,918,084 B1 | 7/2005 | Slaughter et al. | 715/513 |
| 6,922,827 B2 | 7/2005 | Vasilik et al. | |
| 6,950,872 B2 | 9/2005 | Todd, II | 709/227 |
| 6,959,307 B2 | 10/2005 | Apte | |
| 6,963,914 B1 | 11/2005 | Breitbart et al. | 709/226 |
| 6,971,096 B1 | 11/2005 | Ankireddipally et al. | 718/101 |
| 6,976,086 B2 | 12/2005 | Sadeghi et al. | 709/236 |
| 7,000,219 B2 | 2/2006 | Barrett et al. | 717/107 |
| 7,017,146 B2 | 3/2006 | Dellarocas et al. | 717/106 |
| 7,043,722 B2 | 5/2006 | Bau, III | 717/151 |
| 7,051,072 B2 | 5/2006 | Stewart et al. | 709/204 |
| 7,051,316 B2 | 5/2006 | Charisius et al. | 717/103 |
| 7,054,858 B2 | 5/2006 | Sutherland | 707/4 |
| 7,062,718 B2 | 6/2006 | Kodosky et al. | 715/771 |
| 7,069,507 B1 | 6/2006 | Alcazar et al. | 715/530 |
| 7,072,934 B2 | 7/2006 | Helgeson et al. | 709/203 |
| 7,073,167 B2 | 7/2006 | Iwashita | |
| 7,076,772 B2 | 7/2006 | Zatloukal | 717/147 |
| 7,089,584 B1 | 8/2006 | Sharma | |
| 7,096,422 B2 | 8/2006 | Rothschiller et al. | 715/513 |
| 7,107,578 B1 | 9/2006 | Alpern | 717/124 |
| 7,111,243 B1 | 9/2006 | Ballard et al. | 715/744 |
| 7,117,504 B2 | 10/2006 | Smith et al. | 709/201 |
| 7,127,704 B2 | 10/2006 | Van De Vanter et al. | 717/112 |
| 7,143,186 B2 | 11/2006 | Stewart et al. | 709/245 |
| 7,146,422 B1 | 12/2006 | Marlatt et al. | |
| 7,155,705 B1 | 12/2006 | Hershberg et al. | |
| 7,165,041 B1 | 1/2007 | Guheen et al. | |
| 7,181,731 B2 * | 2/2007 | Pace et al. | 717/136 |
| 7,184,967 B1 | 2/2007 | Mital et al. | 705/8 |
| 7,240,331 B2 | 7/2007 | Vion-Dury et al. | 717/117 |
| 7,260,599 B2 | 8/2007 | Bauch et al. | |
| 7,260,818 B1 | 8/2007 | Iterum et al. | |
| 2002/0004848 A1 | 1/2002 | Sudarshan et al. | |
| 2002/0010781 A1 * | 1/2002 | Tuatini | 709/227 |
| 2002/0010803 A1 | 1/2002 | Oberstein et al. | |
| 2002/0016759 A1 | 2/2002 | Macready et al. | |
| 2002/0035604 A1 | 3/2002 | Cohen et al. | |
| 2002/0049788 A1 | 4/2002 | Lipkin et al. | |
| 2002/0073236 A1 | 6/2002 | Helgeson et al. | |
| 2002/0073396 A1 | 6/2002 | Crupi et al. | |
| 2002/0078365 A1 | 6/2002 | Burnett et al. | |
| 2002/0083075 A1 | 6/2002 | Brummel et al. | |
| 2002/0111922 A1 | 8/2002 | Young et al. | |
| 2002/0116454 A1 | 8/2002 | Dyla et al. | |
| 2002/0120685 A1 | 8/2002 | Srivastava et al. | |
| 2002/0143960 A1 | 10/2002 | Goren et al. | |
| 2002/0152106 A1 | 10/2002 | Stoxen et al. | |
| 2002/0161826 A1 | 10/2002 | Arteaga et al. | |
| 2002/0165936 A1 | 11/2002 | Alston et al. | |
| 2002/0169644 A1 | 11/2002 | Greene | |
| 2002/0174178 A1 | 11/2002 | Stawikowski | |
| 2002/0174241 A1 | 11/2002 | Beged-Dov et al. | |
| 2002/0184610 A1 | 12/2002 | Chong et al. | |
| 2002/0188486 A1 | 12/2002 | Gil et al. | |
| 2002/0194244 A1 | 12/2002 | Raventos | |
| 2002/0194267 A1 | 12/2002 | Flesner et al. | |
| 2002/0194495 A1 | 12/2002 | Gladstone et al. | |
| 2003/0004746 A1 | 1/2003 | Kheirolomoom et al. | |
| 2003/0005181 A1 | 1/2003 | Bau, III et al. | |
| 2003/0014439 A1 | 1/2003 | Boughannam | |
| 2003/0018661 A1 | 1/2003 | Darugar | |

| | | | |
|---|---|---|---|
| 2003/0018665 A1 | 1/2003 | Dovin et al. | |
| 2003/0018832 A1 | 1/2003 | Amirisetty et al. | |
| 2003/0018963 A1 | 1/2003 | Ashworth et al. | |
| 2003/0023957 A1 | 1/2003 | Bau et al. | |
| 2003/0028579 A1 | 2/2003 | Kulkarni et al. | |
| 2003/0041198 A1 | 2/2003 | Exton et al. | |
| 2003/0043191 A1 | 3/2003 | Tinsley et al. | |
| 2003/0046266 A1 | 3/2003 | Mullins | |
| 2003/0046591 A1 | 3/2003 | Asghari-Kamrani et al. | |
| 2003/0051066 A1 | 3/2003 | Pace et al. | |
| 2003/0055868 A1 | 3/2003 | Fletcher et al. | |
| 2003/0055878 A1 | 3/2003 | Fletcher et al. | |
| 2003/0074217 A1 | 4/2003 | Beisiegel et al. | |
| 2003/0079029 A1 | 4/2003 | Garimella et al. | |
| 2003/0084203 A1 | 5/2003 | Yoshida et al. | |
| 2003/0110117 A1 | 6/2003 | Saidenberg et al. | |
| 2003/0110446 A1 | 6/2003 | Nemer | |
| 2003/0126136 A1 | 7/2003 | Omoigui | |
| 2003/0149791 A1 | 8/2003 | Kane et al. | |
| 2003/0167358 A1 | 9/2003 | Marvin et al. | |
| 2003/0196168 A1 | 10/2003 | Hu | |
| 2004/0019645 A1 | 1/2004 | Goodman et al. | |
| 2004/0040011 A1 | 2/2004 | Bosworth et al. | |
| 2004/0133660 A1 | 7/2004 | Junghuber et al. | |
| 2004/0148336 A1 | 7/2004 | Hubbard et al. | |
| 2004/0204976 A1 | 10/2004 | Oyama et al. | |
| 2004/0216086 A1 | 10/2004 | Bau | |
| 2004/0225995 A1 | 11/2004 | Marvin et al. | |
| 2004/0260715 A1 | 12/2004 | Mongeon et al. | |
| 2005/0050068 A1 | 3/2005 | Vaschillo et al. | |
| 2005/0278585 A1 | 12/2005 | Spencer | |
| 2006/0206856 A1 | 9/2006 | Breeden et al. | |
| 2006/0234678 A1 | 10/2006 | Juitt et al. | |
| 2007/0038500 A1 | 2/2007 | Hammitt et al. | |

FOREIGN PATENT DOCUMENTS

| | | |
|---|---|---|
| WO | WO 99/23558 | 5/1999 |
| WO | WO 00/29924 | 5/2000 |
| WO | WO 01/90884 A2 | 11/2001 |

OTHER PUBLICATIONS

Marcello Mariucci, "Enterprise Application Saver Development Environments," University of Stuttgart, Overview, Oct. 10, 2000, p. 1-10.

Sun Microsystems, "IPlanet Application Server 6.0 White Paper," Technical Reference Guide, May 25, 2000, all, fig. On p. 20.

Roman, Ed. And Rickard Oberg, "The Technical Benefits of EJB and J2EE Technologies over COM+ and Windows DNA," Dec. 1999, pp. 3-5, fig. 1.

Hewlett-Packard, "HP Application Server," Technical Guide, version 8.0, 1999-2001, all.

Duvos, E. and Besavos, A., "An Infrastructure for the Dynamic Distribution of Web Applications and Services," Dept. of Computer Science, Boston University, Dec. 2000, pp. 4-12.

Kunisetty, "Workflow Modeling and Simulation Using an Extensible Object-Oriented Knowledge Base Management System," CiteSeer, 1996, pp. 1-60.

Van Der Aalst et al, "Verification of XRL: An XML-Based Workflow Language," IEEE, Jul. 2001, pp. 427-432.

Blake, "Rule-Driven Coordination Agents: A Self-Configurable Agent Architecture for Distributed Control," IEEE, Mar. 2001, pp. 271-277.

Dahalin et al, "Workflow Interoperability Using Extensible Markup Language (XML)," IEEE, Jul. 2002, pp. 513-516.

Erich Liebmann, et al., "Adaptive Data Dissemination and Caching for Edge Service Architectures Built with the J2EE", Mar. 2004, ACM Press, 2004 ACM Symposium on Applied Computing, pp. 1717-1724.

Sosnoski, "XML and Java Technologies: Data Binding, Part 1: Code Generation Approaches—JAXB and More", IBM, Jan. 1, 2003, pp. 1-11; http://www-128.ibm.com/developerworks/library/x-databdopt/index.html.

Chen, et al., "eCo Architecture for Electronic Commerce Interoperabillity", CommerceNet eCo Framework Project, Jun. 29, 1999, © 1999 by CommerceNet, Inc., pp. 1-107.

Embury, S.M., et al., "Assisting the Comprehension of Legacy Transactions", Proceedings of the Eighth Working Conference on Reverse Engineering, Oct. 2-5, 2001, © 2001 IEEE, pp. 345-354.

Mays, E., et al., "A Persistent Store for Large Shared Knowledge Bases", IEEE Transactions on Knowledge and Data Engineering, Mar. 1991, vol. 3, Issue 1, © 1991, pp. 33-41.

Tang, C., et al., "Integrating Remote Invocation and Distributed Shared State", Proceedings of the 18th International Parallel and Distributed Processing Symposium, (IPDPS '04), © 2004 IEEE, Apr. 26-30, 2004, 10 pages.

Java™ Debug Interface-definition, retrieved from <URL http://java.sun.com/j2se/1.4.2/docs/guide/jpda/jdi/overview-summary.html on Feb. 21, 2007, pp. 1-3.

Kilgore, R.A., Multi-Language, Open-Source Modeling Using the Microsoft.NET Architecture, Proceedings of the Winter Simulation Conference, Dec. 8-11, 2002, © 2006, IEEE, pp. 629-633.

Bogunovic, N., "A Programming Model for Composing Data-Flow Collaborative Applications", R. Boskovic Institute, Zagreb, 1000, Croatia, IEEE, Mar. 1999, 7 pages, retrieved Apr. 10, 2007.

Sung, S.Y., et al., "A Multimedia Authoring Tool for the Internet", © 1997 IEEE, pp. 304-308, retrieved Apr. 10, 2007.

Smith, M., et al., "Marching Towards a Software Reuse Future", ACM Ada Letters, vol. XIV, No. 6, Nov./Dec. 1994, pp. 62-72, retrieved Apr. 10, 2007.

Mohan, C., et al, "Aries: A Transaction Recovery Method Supporting Fine-Granularity Locking and Partial Rollbacks using Write-Ahead Logging", © 1992, ACM Transactions on Database Systems, vol. 17, No. 1, Mar. 1992, pp. 94-162.

Bea, "Transforming Data Using Xquery Mapper", Bea AquaLogic Service Bus. 2.0 Documentation, 2006, pp. 1-19.

Stylus Studio, "Xquery Mapper", Stylus Studio®, Jun. 5, 2007, pp. 1-6; http://www.stylusstudio.com/xquery_mapper.html.

Altova, "XML-to-XML Mapping", Altova MapForce®, 2007, pp. 1-3.

Jamper, "Jamper-Java XML Mapper", Sourceforge.Net®, Jun. 6, 2007, pp. 1-4; http://jamper.sourceforge.net/.

Alonso, G., et al., "Advanced Transaction Models in Workflow Contexts", Proceedings of the 12th International Conference on Data Engineering, Feb. 1996, retrieved from: http://citeseer.ist.psu.edu/alonso96advanced.html.

Van Der Alst, WMP, et al., "XML Based Schema Definition for Supprt of Inter-organizational Workflow", University of Colorado and University of Eindhoven report, 2000, retrieved from: http://citeseer.ist.psu.edu/vanderaalst00xml.html.

Plaindoux, D., "XML Transducers in Java", Proceedings of the 11th International World Wide Web Conference, Sheraton Waikiki Hotel, Honolulu, HI, USA, May 2002, retrieved from: http://www2002.org/CDROM/poster/132/index.html.

Supplemental European Search Report, EPO2784131.1-1234—PCT/US0233098, dated Aug. 8, 2007, 4 pages.

Allamaraju, et al., "Professional Java Server Programming J2EE 1.3 Edition", WROX, XP002442953, ISBN: 1-861005-37-7, Sep. 2001, p. 1009-p. 1057.

Sun Microsystems: "J2EE™ Connector Architecture 1.0", XP-002442954, Aug. 2001; retrieved from the Internet: URL: http://java.sun.com/j2ee/connector/download.html>.

Microsoft, "Microsoft.net Framework", Microsoft Corporation, 2001, 54 pages.

Muller, "Event-Oriented Dynamic Adaptation of Workflows: Model, Architecture and Implementation", 2002, 351 pages, University of Leipzig, Germany.

Peltz, "Web Service Orchestration" Hewlett-Packard, Jan. 2003, 20 pages.

Ort et al., "Java Architecture for XML Binding (JAXB)", Sun Microsystems, Inc., Mar. 2003, retrieved from <http://java.sun.com/developer/technical/articles/WebServices/jaxb>, pp. 1-14.

Wikipedia (redirected from JAXB), "Java Architecture for XML Binding (JAXB)", Oct. 12, 2007, pp. 1-3.

Shannon, "Java™ 2 Platform Enterprise Edition Specification, v1.3", Sun Microsystems, Inc., Proposed Final Draft Oct. 20, 2000, Chapters 1-11, 170 pages.

* cited by examiner

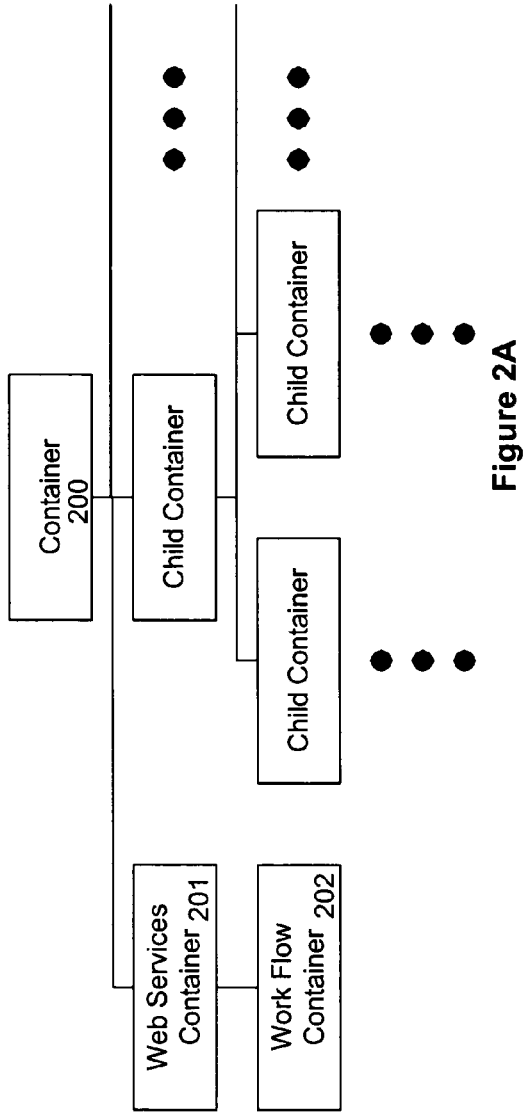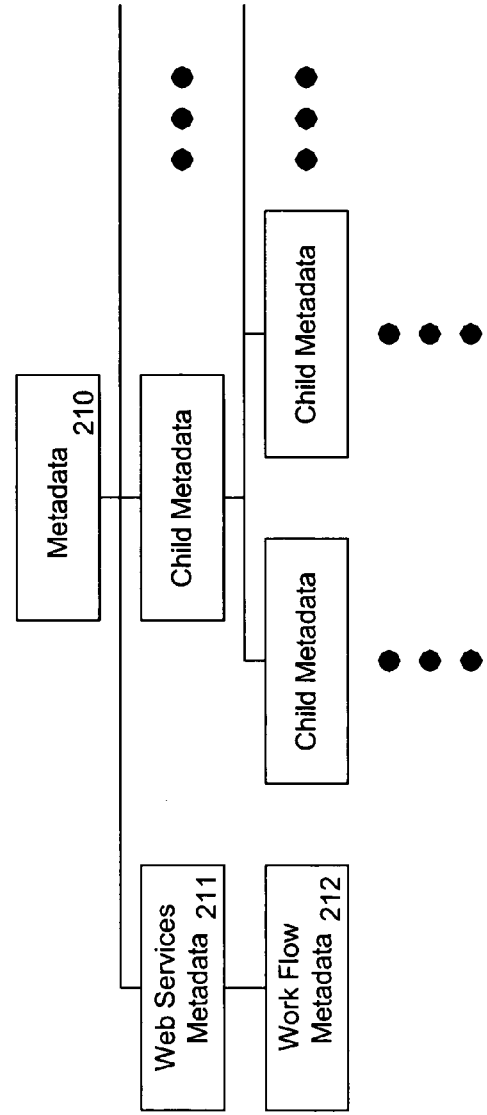

SYSTEMS AND METHODS FOR A COMMON RUNTIME CONTAINER FRAMEWORK

CLAIM OF PRIORITY

This application claims priority from the following application, which is hereby incorporated by reference in its entirety:

U.S. Provisional Application No. 60/451,012, entitled SYSTEMS AND METHODS FOR A COMMON RUNTIME CONTAINER FRAMEWORK, by Kyle Marvin, filed on Feb. 28, 2003.

COPYRIGHT NOTICE

A portion of the disclosure of this patent document contains material which is subject to copyright protection. The copyright owner has no objection to the facsimile reproduction by anyone of the patent document of the patent disclosure, as it appears in the Patent and Trademark Office patent file or records, but otherwise reserves all copyright rights whatsoever.

FIELD OF THE INVENTION

The present invention relates to software runtime containers and software frameworks.

BACKGROUND

The use of software containers provides several advantages when developing and deploying software applications. Containers provide software developers and users with a high level of abstraction. In other words, containers provide software functionality that can be neatly packaged and delivered while hiding significant implementation complexity. As an example, container packaging is often used to develop and deploy modular units of "pluggable" software functionality known as controls. In spite of these advantages, the design, construction, and deployment of containers at runtime have been a complex process, requiring software developers to have a large skill set.

BRIEF DESCRIPTION OF THE DRAWINGS

FIG. 2A is one possible example showing the inheritance structure of a set of runtime containers that can be used in accordance with one embodiment of the present invention.

FIG. 2B is one possible example showing an inheritance structure of a set of metadata object classes that can be used in accordance with one embodiment of the present invention.

DETAILED DESCRIPTION

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

While details of certain embodiments are discussed in this section, it should be clear that other suitable embodiments exist and can be used to achieve similar capabilities. Further, some of these embodiments may include additional functionality not discussed herein, and/or may not contain all of the functionality described herein.

Systems and methods in accordance with embodiments of the present invention provide a complete framework useful in the design, construction, and deployment of software runtime containers, useful to both software developers and end users. Such a framework can allow runtime containers to inherit the functionality and runtime environment attributes of other containers. Having a single runtime container framework, which is extensible to support multiple component types, can provide benefits such as the following:

Allowing common runtime containers to inherit functionality from other common runtime containers.

Creating new component types and adding incremental features more efficiently via a common architecture and leveraging existing code leverage. Divergent implementations of common features are costly to implement in parallel and difficult to synchronize with enhancements over time.

Ensuring behavioral compatibility across component types for common programming model features. This creates a uniform development environment reducing the knowledge and skills required of each developer using the environment. A common programming model involves more than syntax. For example, the common runtime container can support and simplify the development and deployment of controls.

Providing a runtime environment with uniform and maintainable deployment, management and services capability.

Providing a common set of container infrastructure and services (application generation, deployment, logging, debugging, test harness, etc.). A common container expands the leverage of capabilities built around each container.

Services inherited from the use of a common runtime container framework can include, but is not limited to:

Uniform state, context and event management services, possibly using a metadata scheme, in the runtime environment.

Synchronous/Asynchronous Invocation and uniform event management.

A container environment to host controls.

Uniform capabilities for application generation and deployment in both the development and runtime environments.

Context services and event management.

Common Configuration model for multiple input protocols and messaging architectures (i.e. SOAP, HTTP, XML schemas).

A uniform set of security services.

Figure 1:
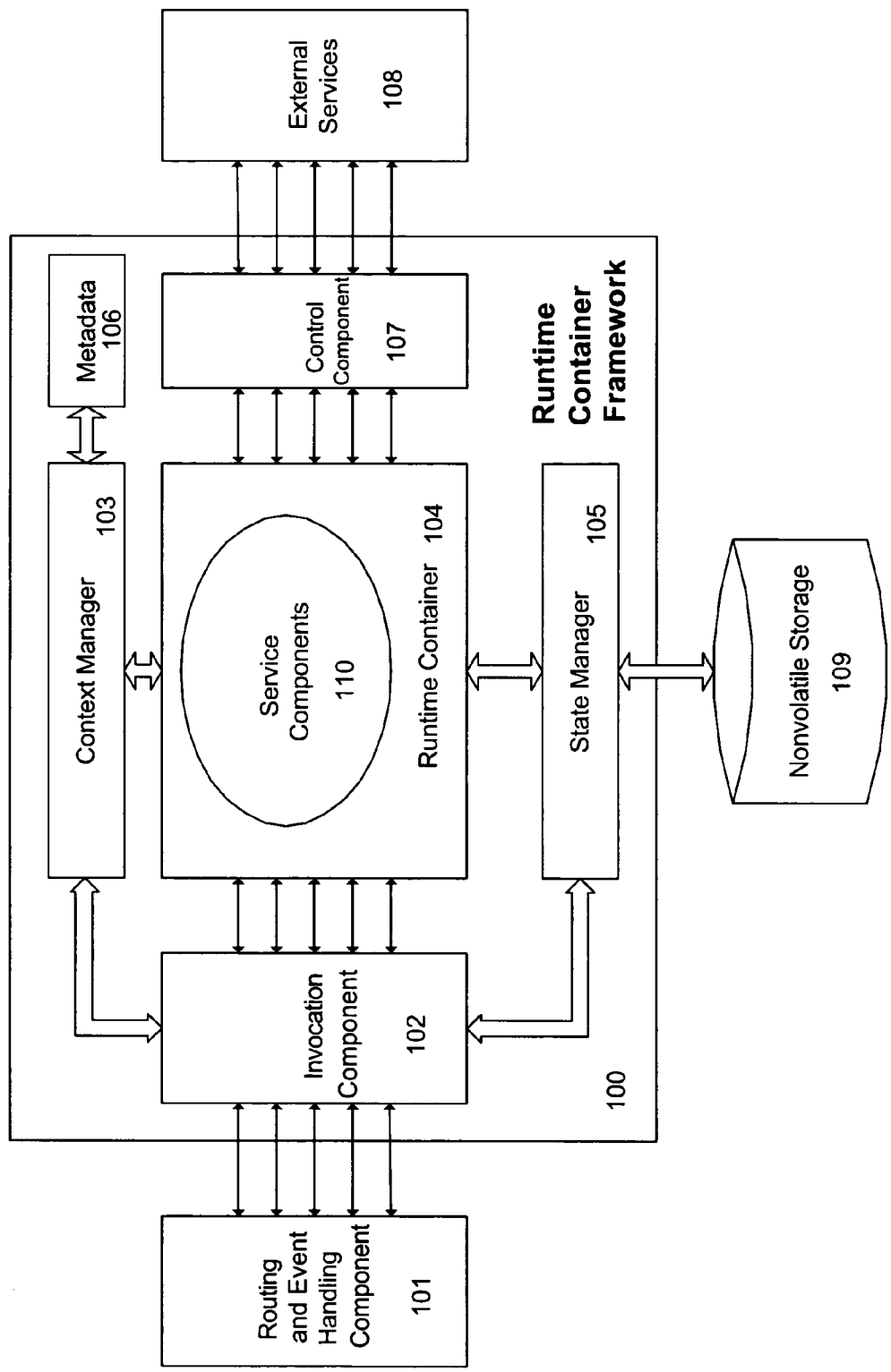
FIG. 1 shows an overview of one exemplary framework for a common runtime container that can be used in accordance with one embodiment of the present invention.

An overview of one exemplary framework for a common runtime container is shown in FIG. 1. Within this exemplary framework 100, the external routing and event handling services or components 101 can be used for communications of requests and responses with external client entities. These services or components can communicate with an invocation component 102 within the runtime container. In some embodiments, these services or components will use a uniform or standardized protocol to communicate with the container. The use of a uniform interface allows for the support of a large number of external interfaces without the need for explicit support for more than one type of interface.

Within the exemplary framework for a common runtime container, invocation component can receive requests and dispatch them to the correct interfaces of service components 110 inside the container 104. This dispatch process can be dependent on the nature of the request, the state information, and context information or other information stored in metadata 106. The metadata herein includes context, state, and/or other information about the data and objects being processed upon the requests. The invocation component can route or manage the returned responses as required, based on the nature of the response, the state information, and context information or other information stored in the metadata.

The container can invoke the services provided by the components within the container to process requests and produce responses. The container can provide state information and context information to these components at runtime. If external services 108 are used during the processing, those services can be engaged through one or more interfaces provided by a control component 107. For embodiments using the Java programming language, the components can be created in the form of Java beans.

Within such a framework, the invocation component and the container can receive both state information and context information. The invocation component or the container can query the state manager 105 to retrieve state from nonvolatile storage 109. Likewise, the invocation component or the container can query the context manager 103 to receive context or other information from the metadata.

Services provided by the components in the common runtime container can perform either preprocessing or post-processing of requests and responses sent to or returned from the hosted components. For example, these processing services can include the processing of message protocols (e.g. SOAP), and request management (e.g. the tracking of session IDs or callback management). The preprocessing and post-processing of messages can be decoupled in that the preprocessing may not depend on post-processing and vice versa.

In some embodiments, common runtime containers are extensible via a hierarchical architecture, i.e., they can be created from a container class. The services of the runtime containers can be exposed through the methods of the container class. Contents of the containers can be accessed through the containers' interfaces. These common runtime containers can be sub-classed through an inheritance mechanism. Using inheritance mechanisms, developers can extend the functionality of common runtime containers. For example, methods and attributes can be inherited from one container to another and extended as required. These common runtime containers can be nested so that containers can inherit functionality and properties from other containers through several levels. Software components, typically supplied by the application developer or user, can be contained within or wrapped by the one or more runtime containers.

One possible example showing the inheritance structure of a set of runtime containers is shown in FIG. 2A. In this example, a Web services container 201 inherits from the base container 200, and the workflow container 202 inherits from the Web services container. Other containers can follow arbitrary complex inheritance structures. In no case should this particular example imply a limitation on the scope, functionality or spirit of the invention.

At the same time, metadata, including context information used by the containers and components, is contained within one or more metadata objects. The metadata objects can also be subclassed through a hierarchical architecture. These objects can be nested so that metadata objects can inherit properties from other metadata objects. The metadata object is of a metadata class (the base class can be referred to Metadata 210) and can have methods (metadata methods) and interfaces (metadata interfaces), that are generally used to get or set metadata values. In some embodiments, the root metadata object is a singleton.

One possible example showing an inheritance structure of a set of metadata object classes is shown in FIG. 2B. In this example, a Web services metadata object 211 inherits from the base metadata object 210, and the workflow metadata object 212 inherits from the Web services metadata object. Other metadata object objects can follow arbitrary complex inheritance structures.

Figure 3:
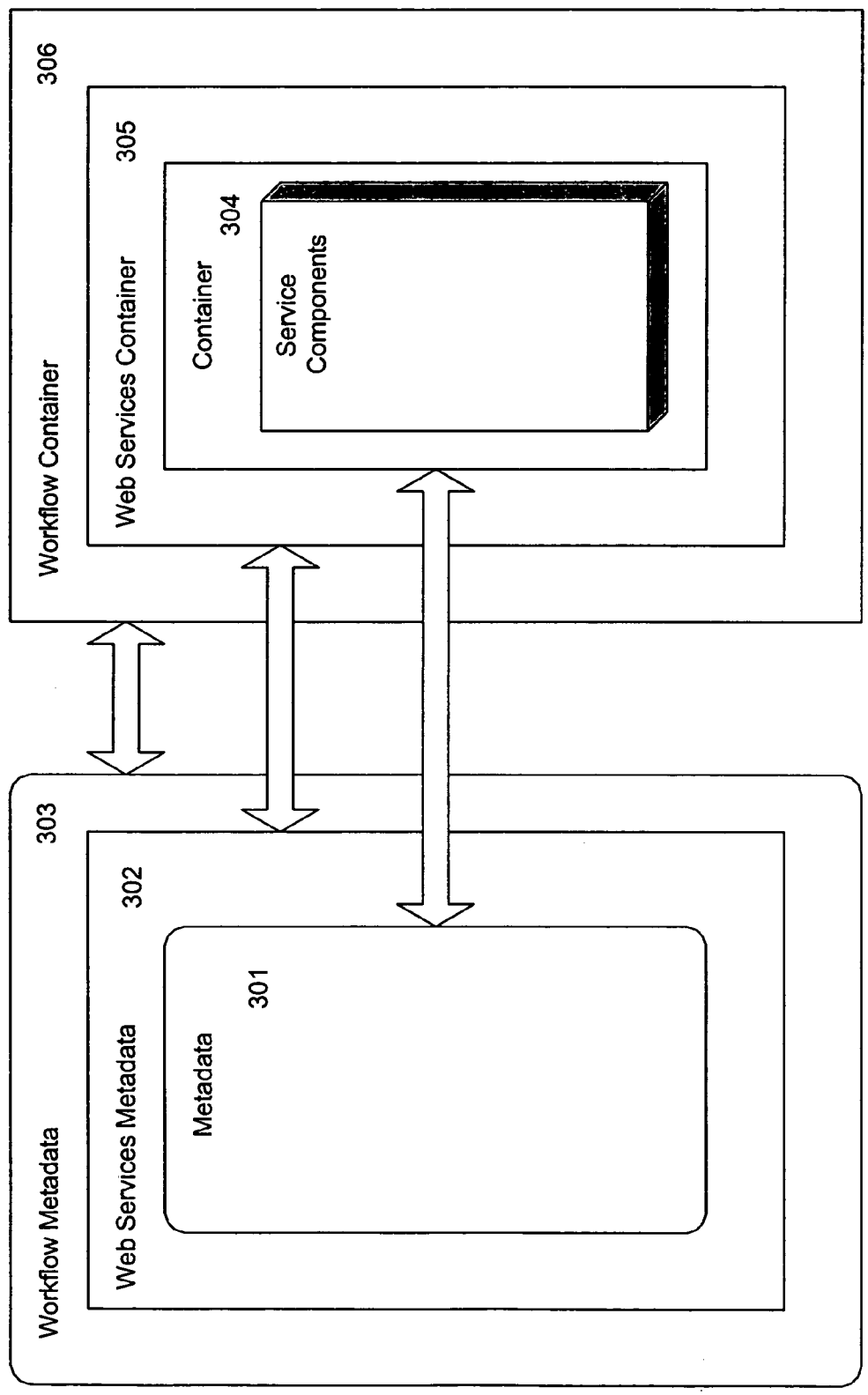
FIG. 3 illustrates the duality between the metadata objects and the containers in accordance with one embodiment of the present invention.

In some embodiments, metadata objects and containers are organized in a duality, wherein containers at one level in the hierarchical architecture can access metadata contained in the metadata objects at that same level in the hierarchical architecture. In other words, there can be a mapping between the metadata objects and the containers. This duality is illustrated in FIG. 3. The arrows connect the containers at each level to the metadata objects at the same level. In this example, a Web services container 305 inherits from the base container 304, and a Web services metadata object 302 inherits from the base metadata object 301. The workflow container 306 inherits from the Web services container, and the workflow metadata object 303 inherits from the Web services metadata object 302. This type of structure can be useful in cases where a workflow application is exposed as Web services, for example. It can be seen that the structure or hierarchy of the objects in this example follow that shown in FIGS. 2A and 2B.

In some embodiments, a well-defined Application Programming Interface (API) can be used to create more levels in the runtime container and metadata object hierarchies. Extensions to this API can allow developers to create new types of containers or customize existing containers with incremental features. In some embodiments, the API will be in the form of one or more public interfaces to the container class. As an example, a "factory pattern" can be used to create other levels in the hierarchy of runtime containers or metadata objects. The created component types can be pluggable in some cases.

As has already been discussed herein, a common runtime container can provide invocation services using components contained therein. Such services can traverse several layers in the hierarchy of runtime containers. The invocation component can encompass both pre-invoke (for processing requests) and post invoke (for processing responses). As an example, some embodiments will use a process such as the following to pass control from one level to the next. Referring to the exemplary structure shown in FIG. 3, the following sequence of steps may occur:

1. A request is received in the runtime environment, which manages any message routing.
2. If the request constitutes the start of a new session, the runtime environment creates a new instance of the runtime containers and the components, possibly using descriptor information contained in the metadata objects.
3. The request is passed to the workflow container, which inherits the thread of control.
4. If this is a new session, requiring security techniques, the runtime containers can initiate and manage the security at any level in the hierarchy. Supported security techniques can include secure sessions, authentication, and role management.
5. Based on a unique identifier, specific to the session at that level in the container hierarchy, the container queries the workflow metadata object (the metadata object for that level of the hierarchy), which returns context or state (if any) information. In this example, the metadata can correspond to the state and context of the workflow session. It should be noted that in some embodiments, the request message might contain a unique, but different identifier for each level of the runtime container hierarchy. In other embodiments, a single identifier may be used. In yet other embodiments, one level in the hierarchy may create and use a unique identifier for the next level in the hierarchy. In some embodiments, the unique identifiers can correspond to the identifiers used by the one or more factories for different container objects.

6. Based on the session's unique identifier and the metadata, any required preprocessing is performed by the container. Examples of preprocessing can include, parsing and processing of message headers (e.g. HTTP and SOAP protocol headers), verification of security information or security tokens, callback management, message routing to one or more destinations, transformation of variables in the request message payload, etc. In some embodiments, the work performed during preprocessing can be defined by a prerequisites list, possibly contained in the metadata.

7. The request is passed to one or more of the interfaces of the Web services container, which inherits the thread of control. This dispatch operation is based on state (if any) and context information derived from the metadata and the nature of the request.

8. The Web services container performs processing similar to steps 5 and 6. In this example, the metadata can correspond to the state and context of the Web services session.

9. The request is passed to one or more of the interfaces of the base container, which inherits the thread of control. This dispatch operation is based on state and context information derived from the metadata and the nature of the request.

10. The base container performs processing similar to steps 5 and 6.

11. Based on the nature of the request, and the context and state (if any) determined from the metadata and the unique session identifier (for the session at the level of the base container), the base container invokes the component interfaces required to process the request and passes the request to the components.

12. The components perform the processing for the request, based on the unique session identifier, the contents of the request, and the context and state (if any) derived from the metadata, and return the results to the base container possibly through a callback operation.

13. If external services are required to process the request, possibly using controls, the common runtime container manages any callback operations, sessions, security, message routing, or other services required to perform this external processing. In some embodiments, the base container will perform the dispatch operation to the external services, managing the response path or callback based on the information in the request and the metadata.

14. The base container receives the response from the components.

15. The based container saves any state or context as required.

16. The base container performs any required post processing on the response based on the unique session identifier and metadata, and passes the response to the Web services container possibly through a callback operation. In some embodiments, the work performed during post-processing can be defined by a prerequisites list, possibly contained in the metadata.

17. The Web services container inherits the thread of control and performs any required post-processing on the response based on the unique session identifier and metadata, and passes the response to the workflow container. In this example, the metadata can correspond to the state and context of the Web services session. In some embodiments, the work performed during post-processing can be defined by a prerequisites list, possibly contained in the metadata.

18. The workflow container inherits the thread of control and performs any required post-processing on the response based on the unique session identifier and metadata, and passes the response to the runtime environment, possibly through a callback operation. In this example, the metadata can correspond to the state and context of the workflow session. In some embodiments, the work performed during post-processing can be defined by a prerequisites list, possibly contained in the metadata.

19. The runtime environment routes the response, which can be in the form of a callback operation.

20. If the session is being terminated, the runtime environment destroys the runtime container objects and their contents.

Figure 4:
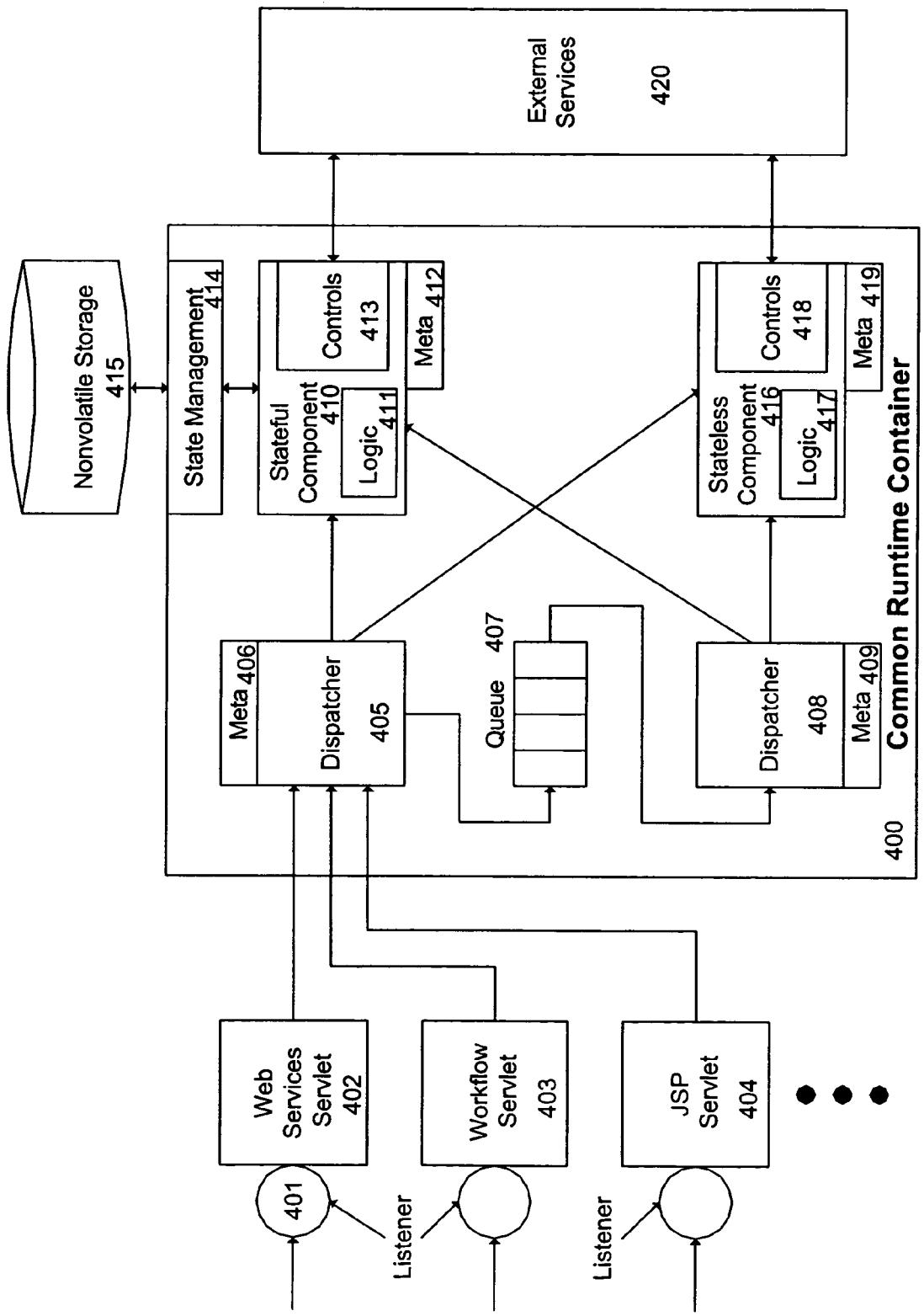
FIG. 4 illustrates an exemplary architecture for a common runtime container that can be used with some embodiments.

An exemplary architecture that can be used with some embodiments for a common runtime container is shown in FIG. 4. In embodiments using the Java programming language, this architecture can be built in the J2EE runtime environment. Other architectures can be applied in alternative embodiments.

Starting at the left hand side of FIG. 4, one or more servlets 402-404 are used to manage communications between the common runtime container 400 and external entities such as clients. A servlet is a computer program (such as a Java Bean) that can run on a computer and provide certain kind of services. The servlet 402 is typically associated with a listener 401 that monitors incoming communications on the external interface of the servlet. Clients or other external entities can send requests and receive responses, using one or more protocols with servlets capable of processing those protocols. As an example only, communications with a servlet can include TCP/IP, HTTP, SOAP, and perhaps application specific (e.g. an XML schema) protocols. Specific servlets can be created to support specific sets of protocols. In some embodiments, the servlets communicate with a dispatcher component 405 using a common or uniform protocol. Thus, the servlets can translate both requests and responses between wide varieties of "wire" protocols and common a communication protocol used by the dispatcher. In some embodiments, the servlets can use a proxy for this communication. Some exemplary protocols include JMS and CORBA messages, and clearly many more are possible. Not all protocols need to be transformed by the servlets. For example, an application specific protocol in the payload of a message may need to be passed unaltered to the application-specific components in the common runtime container. In some embodiments, the servlets can be stateless and synchronous. In some embodiments, the servlets can be modeled as top-level controls.

Still referring to FIG. 4, a first dispatcher 405 receives and processes requests sent from one or more servlets. In some cases, the dispatcher receives direct requests from other components within the same process space. The dispatcher will determine which components to invoke based on the contents of the request and information on context retrieved from metadata (Meta) 406. Requests requiring asynchronous processing are dispatched to the queue 407. Requests requiring synchronous processing can be routed directly to a stateful component (for stateful processing) 410 or a stateless component (for stateless processing) 416. A second dispatcher 408 receives the asynchronous requests dispatched to the queue 407. The dispatcher will determine which components to invoke based on the contents of the request and information on context retrieved from metadata 409. In some embodiments, the queue can follow a FIFO scheme, while some other embodiments can allow requests to be ordered by priority. This second dispatcher can dispatch requests requiring synchronous processing be routed directly to a stateful component (for stateful processing) or a stateless component (for stateless processing). In some embodiments using the Java programming language, the dispatcher can be in the form of an Enterprise Java Bean (EJB).

Still referring to FIG. 4, stateless processing can be performed by one or more stateless components. The stateless component 416 can derive context information (e.g. information related to the session) from the metadata 419. A stateless component can contain an arbitrary amount of code for the processing logic 417. In many cases this logic is application-specific. A stateless component can call other stateless components within the common runtime container as part of a processing chain. A stateless component can call one or more external services 420. In some embodiments, synchronous or asynchronous controls 418 associated with the component are used for communications with these external services. Other architectures can be used in other embodiments. In some embodiments using the Java programming language, these components can be constructed as Java Beans.

Still referring to FIG. 4, stateful processing can be performed by one or more stateless components. The stateful component 410 can derive context information (e.g. information related to the session) from metadata 412. State information is retrieved from nonvolatile storage 415 through a state management component 414. In some embodiments, the state information can be stored in the form of one or more Binary Large Objects (BLOBs). In other embodiments, the state information can be stored in relational tables in a Relational Database Management System (RDBMS). In yet other embodiments, both BLOBs and relational tables can be used. A stateful component can contain an arbitrary amount of code for the processing logic 411. In many cases this logic is application specific. A stateful component can call stateless components or other stateful components within the common runtime container as part of a processing chain. A stateful component can call one or more external services 420. In some embodiments, synchronous or asynchronous controls 413 associated with the component are used for communications with these external services. Other architectures can be used in other embodiments. In some embodiments using the Java programming language, these components can be constructed as Java Beans.

In some embodiments, the following process can be used to generate and use the common runtime container and other associated software. User supplied source code can be compiled in the usual manner with a suitable complier. The automatic code generation and class assembly for the container, servlets, components and controls can be performed at load time. In some cases, metadata or deployment descriptors created by the developer or system administrator are used to guide the automatic code generation and assembly process. In some embodiments, the runtime environment may perform configuration verification at runtime to prevent problems with configuration mismatch to runtime environment. When a new session is initiated, an instance of the containers and associated components and controls are generated. Processing for this session is then carried out as has already been described for the duration of the session. When the session completes, the containers and their contents are destroyed and the process space and system resources are reclaimed.

In some embodiments of the present invention, the invocation component in a common runtime container framework can be event-driven. Event delivery (calls in from a primary client or callbacks from controls) to a component as well as event generation (callbacks to a primary client or calls into controls) from a component can be synchronous or asynchronous. This invocation component can include synchronous and asynchronous capabilities such as the following:

Base mechanism for locating the dispatcher associated with a component. For example, in a Java environment, the JVM cache may be used. Alternatively, a two-level cache backed by JNDI to support remote lookup/invocation as well as local dispatch can be used.

Ability to construct requests defining dispatchable operations or callbacks that target a specific conversation or control instance. The request interface can be an abstract interface supporting variability in internal request wire protocols, flexible mapping from wire protocol to class method signatures, and facilities for streaming requests.

Ability to dispatch requests synchronously using local method calls or asynchronously by enqueuing on an asynchronous work queue for the service.

Well-defined asynchronous request retry, delay, and exception handling semantics that allow container and/or user code to fire on asynchronous request failure.

Preservation of authentication context for both synchronous and asynchronous request dispatch. For example, for asynchronous invocation, the principal at time of enqueue can be restored when the request is dispatched asynchronously.

Definition and implementation of a more general mechanism for component dispatcher identity and lookup. For example, in a Java language environment, a JNDI-based scheme based on the current ServiceHandle interface can be used.

In some embodiments, there can be a clear separation of the generic container set of class implementation interfaces from, for example, Web services or other specific services interfaces. For example, in some Java language environments, a generic set of container interfaces (e.g. Stream_Web_Services_Request) is separated from Web service container specific subclasses (Soap-Web_Services_Request, MimeXml-Request). Some embodiments supply retry/failure exception handling semantics for failed requests, which can expose user code.

In some embodiments of the present invention, the runtime container in a common runtime container framework can define simplified component abstractions that are transparently mapped (perhaps through code generation and assembly) to a more complex set of runtime environment components to create and deploy applications. For example, in some Java enterprise application environments, the runtime environment components are associated with the J2EE platform which hosts the Java beans comprising the application. This runtime container to generate and deploy application services can include capabilities such as the following:

Generating appropriate runtime environment modules containing components required to support dispatch, state management, and all embedded controls. In some J2EE environments, these modules will be in the form of Enterprise Java Beans (EJB).

Merging the generated modules into a larger application for the runtime environment, which might consist of both component-specific modules (e.g. http listening for a Web services application) and user-developed modules (e.g. EJBs or Web services code).

Supporting a development mode where the larger application for the runtime environment is developed and packaged (e.g. and exploded EAR format for J2EE applications) into internally generated modules that are hidden from the developer's view of the application.

Supporting fast, iterative development and test at the level of a single generated module.

Supporting the generation of a production deployable packaged application (e.g. an EAR file) using the sources and components found within the development mode environment (e.g. an exploded EAR).

In some embodiments of the present invention, the runtime container in a common runtime container framework can expose a common configuration model for how components and control attributes are specified declaratively and programmatically by the developer, as well as providing a common model for declarative configuration override at application deployment time. A common configuration model provided by the runtime container can include capabilities such as the following:

Defining a base mechanism by which component (e.g. a service or control) configuration is loaded into memory based upon metadata contained within the class file and possibly derived from annotations.

Providing an override model allowing a subset of the component configuration that is dynamically configurable using an external configuration mechanism such as a property file or descriptor.

Providing an API set allowing a component or control type implementation to access its own configuration state at runtime. This could be either push (initialization time) or pull (run-time) based.

Providing a possibly dynamic, override model for reconfiguration.

Defining and implementing the interfaces for run-time access to configuration data.

In some embodiments of the present invention, the state manager in a common runtime container framework can provide the ability to develop stateful components where the physical mechanisms used to locate, manage, and persist state are largely transparent to the developer. This state manager can include capabilities such as the following:

Looking up state instance based upon key value(s).

Mapping between internal persistence formats and the user view of state.

Concurrency protection (i.e. serialization of requests and events).

Multiple state-persistence formats offering varying degrees of longevity, durability, and transactional attributes of state (from in-memory to transacted DB).

Aging/idle timeout of state instances.

Visibility and versioning (i.e. ability to externally visualize and manage state).

Extensible state mechanisms (i.e. the ability to store component internal state along with user state).

Persistence using in-memory state for higher performance/short-lived conversations.

Fine-grained control over internal persistence formats (for visibility and versioning).

Base level support for secondary conversation keys (i.e. allowing a client or control to define its own key that maps back to the primary key space).

Fine-grained control over state characteristics on a per-event basis (i.e. read-only methods, narrowing of read/write for partial state, etc).

Mechanisms for how a specific component type can extend base user state to add in component-specific internal state.

In some embodiments of the present invention, the context manager in a common runtime container framework can expose component-level services and events to the programmer. This context manager can include capabilities such as the following:

Allowing a component type implementation for defining a context interface, which may expose container-specific services to the developer.

Providing hooks allowing the component type implementation to perform container-specific processing at various points in the request, conversational instance, and application life cycle. Some examples of these capabilities can include:

Pre-request execution

Post-request execution

Conversation start

Conversation end

Stateless instance reset

Application deploy

Application undeploy

Application reset

Providing the ability to store and retrieve data from thread specific local context storage associated with the current request. This can allow container-specific information to be associated with the calling context without passing directly on the call stack (since the stack may include user methods where plumbing is best not exposed).

A uniform mechanism for discovering and initializing a component-pluggable context object.

A uniform set of internal context APIs for life-cycle event notification.

Facilities for application life-cycle hooks.

In some embodiments of the present invention, the control component in a common runtime container framework can support the concept of controls to provide a simplified and common interaction model for how a programmer interacts with external subsystems. This control component can include capabilities such as the following:

Instantiation, initialization, and hookup of control instances associated with a component. This process can be immediate (at component initialization) or lazy (demand driven) and is selectable on a per-control-instance basis.

Routing and dispatching of synchronous and asynchronous calls from the component onto the control and of synchronous or asynchronous events from the control onto component event handlers.

Routing of external system events to internal events trigger by, for example, a control instance. These can be publicly exposed events or internal control events that do not appear as part of the public contract for a control.

Allowing controls to participate in lifecycle events of the associated component. Examples are conversation start, conversation finish, stateless instance reset, etc.

Allowing control instances to participate in the overall state management of the containing component.

Providing factories to support the dynamic instantiation of controls.

Providing the capability to define internal control (private) callbacks that are not exposed up as events to, for example, the web services developer. In some cases, these capabilities are used to dispatch internal control events from an external subsystem.

Participating in annotation validation and metadata construction processes. Controls can throw compile or load time errors, and to build efficient internal representations of attributes for use in dispatch.

Controlling annotations to indicate if publicly defined events are required (compile or load time error if no event handler is defined), recommended (warning if not present), or optional.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a storage medium (media) having instructions stored thereon/in which can be used to program a computer to perform any of the features presented herein. The storage medium can include, but is not limited to, any type of disk including floppy disks, optical discs, DVD, CD-ROMs, micro drive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and applications.

The foregoing description of the preferred embodiments of the present invention has been provided for the purposes of illustration and description. It is not intended to be exhaustive or to limit the invention to the precise forms disclosed. Many modifications and variations will be apparent to the practitioner skilled in the art. Particularly, while the concept "component" is used in the embodiments of the systems and methods described above, it will be evident that such concept can be interchangeably used with equivalent concepts such as, service, event, control, class, object, bean, and other suitable concepts. Embodiments were chosen and described in order to best describe the principles of the invention and its practical application, thereby enabling others skilled in the art to understand the invention, the various embodiments and with various modifications that are suited to the particular use contemplated. It is intended that the scope of the invention be defined by the following claims and their equivalents.

What is claimed is:

1. A computer-implemented system to provide a common runtime container framework, comprising:
   a microprocessor;
   a plurality of runtime containers operable to process service requests and providing application services, wherein the plurality of runtime containers are organized in a first hierarchical architecture;
   a plurality of metadata objects operable to provide metadata on context, state, and/or runtime information pertinent to the data and objects being handled by the plurality of runtime containers, wherein the plurality of metadata objects are organized in a second hierarchical architecture; and
   wherein the first hierarchical architecture and the second hierarchical architecture are implemented according to Object-Oriented class inheritance, wherein each runtime container object at one layer of the first hierarchical architecture functionally interacts with a metadata object at a corresponding layer in the second hierarchical architecture, the dual interaction between the objects in the first hierarchical architecture and the second hierarchical architecture comprising:
   invoking application services within a runtime container in the first hierarchical architecture; and
   utilizing services performed by a correspondent metadata object in the second hierarchical architecture,
   wherein the service provided by a metadata object in the second hierarchical architecture comprises providing state information and context information of the application runtime objects needed by the runtime container object directed to handle at least one of the service requests,
   wherein the metadata object comprises object methods to get and set metadata required by the runtime container object,
   wherein the runtime container object comprises object methods to invoke the needed service provided by the methods of the metadata object.

2. The system in claim 1, further comprising:
   a well-defined API capable of creating new types of runtime containers, or customizing existing containers with incremental features.

3. The system in claim 1, further comprising:
   a well-defined API capable of creating new levels in the first hierarchical architecture and the second hierarchical architecture.

4. The system in claim 1, wherein:
   at least one of the plurality of runtime containers is a web services container.

5. The system in claim 4, wherein:
   at least one of the plurality of runtime containers is a workflow container that inherits from a web services container.

6. The system in claim 1, wherein:
   at least one of the plurality of metadata objects is a web services metadata object.

7. The system in claim 6, wherein:
   at least one of the plurality of metadata objects is a workflow metadata object that inherits from a web services metadata object.

8. A method to provide a common runtime container framework, comprising:
   processing service requests and providing application services via a runtime container of a plurality of runtime containers, wherein the plurality of runtime containers are organized in a first hierarchical architecture;
   providing metadata on context, state, and/or runtime information pertinent to the data and objects being handled by the runtime container via a metadata object of a plurality of metadata objects, wherein the plurality of metadata objects are organized in a second hierarchical architecture; and
   wherein the first hierarchical architecture and the second hierarchical architecture are implemented according to Object-Oriented class inheritance, wherein each runtime container object at one layer of the first hierarchical architecture functionally interacts with a metadata object at a corresponding layer in the second hierarchical architecture, the dual interaction between the objects in the first hierarchical architecture and the second hierarchical architecture comprising:
invoking application services within a runtime container in the first hierarchical architecture; and
utilizing services performed by a correspondent metadata object in the second hierarchical architecture,
wherein the service provided by a metadata object in the second hierarchical architecture comprises providing state information and context information of the application runtime objects needed by the runtime container object directed to handle at least one of the service requests,
wherein the metadata object comprises object methods to get and set metadata required by the runtime container object,
wherein the runtime container object comprises object methods to invoke the needed service provided by the methods of the metadata object.

9. The method in claim 8, further comprising:
creating new types of runtime containers, or customizing existing containers with incremental features.

10. The method in claim 8, further comprising:
creating new levels in the first hierarchical architecture and the second hierarchical architecture.

11. The method in claim 8, wherein:
at least one of the plurality of runtime containers is a web services container.

12. The method in claim 11, wherein:
at least one of the plurality of runtime containers is a workflow container that inherits from a web services container.

13. The method in claim 8, wherein:
at least one of the plurality of metadata objects is a web services metadata object.

14. The method in claim 13, wherein:
at least one of the plurality of metadata objects is a workflow metadata object that inherits from a web services metadata object.

15. A machine readable medium having instructions stored thereon that when executed by a processor cause a system to:
process service requests and provide application services via a runtime container of a plurality of runtime containers, wherein the plurality of runtime containers are organized in a first hierarchical architecture;
provide metadata on context, state, and/or runtime information pertinent to the data and objects being handled by the runtime container via a metadata object of a plurality of metadata objects, wherein the plurality of metadata objects are organized in a second hierarchical architecture; and
wherein the first hierarchical architecture and the second hierarchical architecture are implemented according to Object-Oriented class inheritance, wherein each runtime container object at one layer of the first hierarchical architecture functionally interacts with a metadata object at a corresponding layer in the second hierarchical architecture, the dual interaction between the objects in the first hierarchical architecture and the second hierarchical architecture comprising:
invoking application services within a runtime container in the first hierarchical architecture; and
utilizing services performed by a correspondent metadata object in the second hierarchical architecture,
wherein the service provided by a metadata object in the second hierarchical architecture comprises providing state information and context information of the application runtime objects needed by the runtime container object directed to handle at least one of the service requests,
wherein the metadata object comprises object methods to get and set metadata required by the runtime container object,
wherein the runtime container object comprises object methods to invoke the needed service provided by the methods of the metadata object.

16. The machine readable medium of claim 15, further comprising instructions that when executed cause the system to:
create new types of runtime containers, or customize existing containers with incremental features.

17. The machine readable medium of claim 15, further comprising instructions that when executed cause the system to:
create new levels in the first hierarchical architecture and the second hierarchical architecture.

18. The machine readable medium of claim 15, wherein:
at least one of the plurality of runtime containers is a web services container.

19. The machine readable medium of claim 18, wherein:
at least one of the plurality of runtime containers is a workflow container that inherits from a web services container.

20. The machine readable medium of claim 15, wherein:
at least one of the plurality of metadata objects is a web services metadata object.

21. The machine readable medium of claim 20, wherein:
at least one of the plurality of metadata objects is a workflow metadata object that inherits from a web services metadata object.

* * * * *

UNITED STATES PATENT AND TRADEMARK OFFICE
CERTIFICATE OF CORRECTION

PATENT NO. : 7,444,620 B2  Page 1 of 1
APPLICATION NO. : 10/776435
DATED : October 28, 2008
INVENTOR(S) : Marvin It is certified that error appears in the above-identified patent and that said Letters Patent is hereby corrected as shown below:

In Title page 3, column 1, line 1, delete "Saver" and insert -- Server --, therefor.

In Title page 3, column 1, line 33, delete "Interoperabillity" and insert -- Interoperability --, therefor.

In Title page 3, column 2, line 41, delete "Van Der Alst," and insert -- Van Der Aalst, --, therefor.

In Title page 3, column 2, line 42, delete "Supprt" and insert -- Support --, therefor.

In Title page 3, column 2, line 62, delete "Service" and insert -- Services --, therefor.

Signed and Sealed this

Twenty-seventh Day of April, 2010

David J. Kappos
*Director of the United States Patent and Trademark Office*